(12) United States Patent
Palenius et al.

(10) Patent No.: US 12,477,512 B2
(45) Date of Patent: Nov. 18, 2025

(54) EXTENDED BUFFERING OF DATA-TRANSFER CONTROL INFORMATION

(71) Applicant: Sony Group Corporation, Tokyo (JP)

(72) Inventors: Torgny Palenius, Barsebäck (SE); Anders Berggren, Lund (SE); Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 392 days.

(21) Appl. No.: 18/018,244

(22) PCT Filed: Jul. 22, 2021

(86) PCT No.: PCT/EP2021/070516
§ 371 (c)(1),
(2) Date: Jan. 26, 2023

(87) PCT Pub. No.: WO2022/028905
PCT Pub. Date: Feb. 10, 2022

(65) Prior Publication Data
US 2023/0300788 A1  Sep. 21, 2023

(30) Foreign Application Priority Data

Aug. 7, 2020 (SE) .................................. 2030250-1

(51) Int. Cl.
*H04W 68/00* (2009.01)
(52) U.S. Cl.
CPC ................................ *H04W 68/005* (2013.01)
(58) Field of Classification Search
CPC ... H04W 68/00; H04W 68/005; H04W 76/10; H04W 76/18; H04W 76/27; H04W 88/06; Y02D 30/70
See application file for complete search history.

(56) References Cited

U.S. PATENT DOCUMENTS

2016/0270027 A1* 9/2016 Ang ..................... H04W 68/00
2018/0249367 A1   8/2018 Rosa
(Continued)

FOREIGN PATENT DOCUMENTS

| CN | 103380632 A | 10/2013 |
| CN | 110622589 A | 12/2019 |

(Continued)

OTHER PUBLICATIONS

International Search Report and Written Opinion from corresponding International Application No. PCT/EP2021/070516, mailed on Jan. 11, 2022, 18 pages.

(Continued)

*Primary Examiner* — Siu M Lee
(74) *Attorney, Agent, or Firm* — Tucker Ellis LLP

(57) ABSTRACT

A method of operating a wireless communication device (101) includes, while operating in a disconnected mode (302) with respect to a communications network (99, 100, 100-1, 100-2), receiving a paging message (4025) from the communications network (99, 100, 100-1, 100-2), the paging message being indicative of an incoming call. The method also includes, upon detecting at least one busy event, transmitting a response message (4030) associated with the paging message (4025) to the communications network (99, 100, 100-1, 100-2), the response message (4030) being indicative of the wireless communication device (101) being temporarily busy.

12 Claims, 8 Drawing Sheets

(56) References Cited

U.S. PATENT DOCUMENTS

| | | | |
|---|---|---|---|
| 2020/0077361 A1 | 3/2020 | Huang et al. | |
| 2022/0078742 A1* | 3/2022 | Tiwari | H04W 60/005 |
| 2022/0191778 A1* | 6/2022 | Kumar | H04W 36/142 |
| 2022/0191824 A1* | 6/2022 | Kumar | H04W 68/02 |
| 2022/0240213 A1* | 7/2022 | Ly | H04W 60/02 |
| 2023/0007624 A1* | 1/2023 | Murray | H04W 68/005 |
| 2023/0127408 A1* | 4/2023 | Wu | H04W 76/27 |
| | | | 455/458 |
| 2024/0057152 A1* | 2/2024 | Kazmi | H04W 74/0808 |

FOREIGN PATENT DOCUMENTS

| | | |
|---|---|---|
| CN | 110679186 A | 1/2020 |
| CN | 110999438 A | 4/2020 |
| CN | 110999506 A | 4/2020 |
| EP | 3591948 A1 | 1/2020 |
| WO | 2020076460 A1 | 4/2020 |
| WO | 2021033586 A1 | 2/2021 |

OTHER PUBLICATIONS

Office Action and Search Report from corresponding Swedish Application No. 2030250-1, mailed on May 4, 2021, 13 pages.

"Study on system enablers for devices having multiple Universal Subscriber Identity Modules", 3rd Generation Partnership Project (3GPP), Dec. 2019, TR 23.761, V0.2.0, 19 pages.

Sony, "Solution KI#1: Busy indication as a paging response", 3rd Generation Partnership Project (3GPP), Nov. 2019, Reno, Nevada, S2-1912408 (revision of S2-1911141), 5 pages.

Sony , KI #1, Sol #3: Update to remove EN , 3GPP TSG SA WG2 #139e S2-2003675 , Jun. 1, 2020.

3GPP, 3rd Generation Partnership Project; Technical Specification Group Services and System Aspects; Study on system enablers for devices having multiple Universal Subscriber Identity Modules (USIM) (Release 17), 3GPP TR 23.761, Jan. 31, 2020, 37 pgs., V0.3.0.

Nokia, "KI#2,KI#3: New Solution: establishment of association on user plane for paging notification on user plane", 3GPP tsg_sa\wg2_arch,tsgs2_139e_electronic, May 22, 2020, 4 pgs., S2-2003765.

* cited by examiner

EXTENDED BUFFERING OF DATA-TRANSFER CONTROL INFORMATION

TECHNICAL FIELD

Various examples of the disclosure generally relate to a paging procedure of a wireless communication device a response message transmitted by the wireless communication device in response to receiving a paging message, the response message being indicative of the wireless communication device being temporarily unable to respond to an incoming data transfer. Various examples of the disclosure generally relate to buffering data transfer control information associated with the data transfer, until a busy event is resolved.

BACKGROUND

Mobile communication using a wireless communication device (sometimes also referred to as user equipment, UE) is widespread. To reduce power consumption of a UE, the UE can transition from a connected mode—during which it can participate in one or more data transfers—to a disconnected mode—during which data transfers are at least temporarily suspended. Examples of disconnected modes include Third Generation Partnership (3GPP) New Radio (NR) Radio Resource Control (RRC) Idle mode and RRC Inactive mode. Various implementations of a disconnected modes are known, but generally, a re-transition from the disconnected mode to the connected mode can be triggered by a paging procedure. Here, one or more paging signals are transmitted at a paging occasion (PO) to the UE. This triggers the re-transition from the disconnected mode to the connected mode, e.g., by implementing a random-access procedure.

It has been observed that such triggering of the re-transition from the disconnected mode to the connected mode in response to receiving one more paging signals can be inefficient in terms of flexibility and power consumption. To address this issue, it is known that the UE can signal that it is temporarily busy, WO 2020/076460 A1. Then, the paging procedure can be stopped, and further data may not be transmitted to the UE.

Scenarios can occur where even such a busy indication has limited flexibility and is inefficient in terms of power consumption.

SUMMARY

Accordingly, a need exists for advanced techniques of handling an incoming data transfer directed to a wireless communication device. A need exists for advanced techniques of implementing an associated paging procedure. In particular, a need exists for techniques which overcome or mitigate at least some of the above-identified restrictions or drawbacks.

This need is met by the features of the independent claims. The features of the dependent claims define embodiments.

A method of operating a UE is provided. The method includes receiving a paging message. The paging message is indicative of a data transfer. The paging message is received from a communications network. The method also includes transmitting a response message to the communications network, e.g., upon detecting at least one busy event. The response message is indicative of the wireless communication device being temporarily busy.

The wireless communication device being temporarily busy can correspond to the wireless communication device being temporarily unable to engage in the data transfer.

The data transfer can be directed to the wireless communication device. I.e., an intended recipient or a terminal node of the data transfer can be the wireless communication device or a subscriber associated with the wireless communication device.

For example, the data transfer could be in incoming call. Here, the wireless communication device being temporarily busy can correspond to the wireless communication device being temporarily unable to respond to the incoming call.

The response message can be associated with the paging message. This can mean that the response message is transmitted in resources of a time-frequency resource grid indicated by the paging message. The response message could include a pointer towards the paging message.

The paging message can be received while operating in a disconnected mode, e.g., an inactive mode or an idle mode, with respect to the communications network.

For example, the response message may include an indicator indicative of a predicted time duration for which the wireless communication device will be busy.

A computer program or a computer-program product or a computer-readable storage medium includes program code. The program code can be executed by at least one processor. Executing the program code causes the at least one processor to perform a method of operating a UE. The method includes receiving a paging message while operating in a disconnected mode with respect to a communications network. The paging message is indicative of a data transfer. The paging message is received from the communications network. The method also includes transmitting a response message associated with the paging message to the communications network, upon detecting at least one busy event. The response message is indicative of the wireless communication device being temporarily busy.

A wireless communication device includes a control circuitry. The control circuitry is configured to receive a paging message from a communications network. The paging message is indicative of a data transfer. The control circuitry is further configured to transmit a response message associated with the paging message to the communications network, upon detecting a least one busy event. The response message is indicative of the wireless communication device being temporarily busy.

A method of operating a paging control node of a communications network is provided. The method includes triggering a paging procedure to page a wireless communication device, upon detecting a data transfer for the wireless communication device. The method also includes receiving, from the wireless communication device, a response message. The response message is indicative of the wireless communication device being temporarily busy. The method also includes providing an indicator indicative of the wireless communication device being unable to engage in the data transfer to a session control node. The session control node is associated with the data transfer. Thereby, buffering of data transfer control information associated with the data transfer can be facilitated.

For example, the indicator indicative of the wireless communication device being unable to engage in the data transfer could indicate that the wireless communication device is busy. It would also be possible that the indicator indicative of the wireless communication device being unable to engage in the data transfer indicates that the wireless communication device is unreachable and/or unresponsive and/or that the paging procedure has failed.

The indicator indicative of the wireless communication device being unable to engage could include an indicator of an estimated time duration. This estimated time duration may indicate for how long the UE will be unable to engage in the data transfer.

Detecting the data transfer can include receiving a paging request from a session control node associated with the data transfer.

A computer program or a computer-program product or a computer-readable storage medium includes program code. The program code can be loaded and executed by at least one processor. Upon executing the program code, the at least one processor performs a method of operating a paging control node of a communications network. The method includes triggering a paging procedure to page a wireless communication device, upon detecting a data transfer for the wireless communication device. The method also includes receiving, from the wireless communication device, a response message. The response message is indicative of the wireless communication device being temporarily busy. The method also includes providing an indicator indicative of the wireless communication device being unable to engage in the data transfer to a session control node. The session control node is associated with the data transfer. Thereby, buffering of data transfer control information associated with the data transfer can be facilitated.

A paging control node of a communications network includes control circuitry. The control circuitry is configured to trigger a paging procedure to page a wireless communication device, upon detecting a data transfer for the wireless communication device. The method also includes receiving a response message from the wireless communication device. The response message can be associated with the paging message. The response message is indicative of the wireless communication device being temporarily busy. The method also includes providing an indicator indicative of the wireless communication device being unable to engage in the data transfer to a session control node. The session control node is associated with the data transfer. Thereby, buffering of the data transfer control information associated with the data transfer is facilitated.

A method of operating a session control node of a communications network is provided. The method includes determining that a wireless communication devices temporarily unable to engage in an incoming data transfer, upon detecting the incoming data transfer for the wireless communication device. Then, data transfer control information of the data transfer can be buffered, in response to determining that the wireless communication device is temporarily unable to engage in the incoming data transfer. It is then possible to facilitate providing the data transfer control information to the wireless communication device when completing said buffering.

For example, said determining that the wireless communication devices temporarily unable to engage in the data transfer may include obtaining, from a paging control node, an indicator indicative of the wireless communication device being temporarily busy.

A computer program or a computer-program product or a computer-readable storage medium includes program code. The program code can be executed by at least one processor. Upon executing the program code, the at least one processor performs a method of operating a session control node of a communications network. The method includes determining that a wireless communication devices temporarily unable to engage in an incoming data transfer, upon detecting the incoming data transfer for the wireless communication device. Then, data transfer control information of the data transfer can be buffered, in response to determining that the wireless communication device is temporarily unable to engage in the incoming data transfer. It is then possible to facilitate providing the data transfer control information to the wireless communication device when completing said buffering.

A session control node includes control circuitry. The control circuitry is configured to determine that a wireless communication devices temporarily unable to engage in a data transfer, upon detecting the data transfer for the wireless communication device. Then, data transfer control information of the data transfer is buffered, in response to said determining that the wireless communication devices temporarily unable to engage in the data transfer. It is then possible to facilitate providing the data transfer control information to the wireless communication device, e.g., when completing said buffering.

It is to be understood that the features mentioned above and those yet to be explained below may be used not only in the respective combinations indicated, but also in other combinations or in isolation without departing from the scope of the invention.

DETAILED DESCRIPTION OF EXAMPLES

Figure 1:
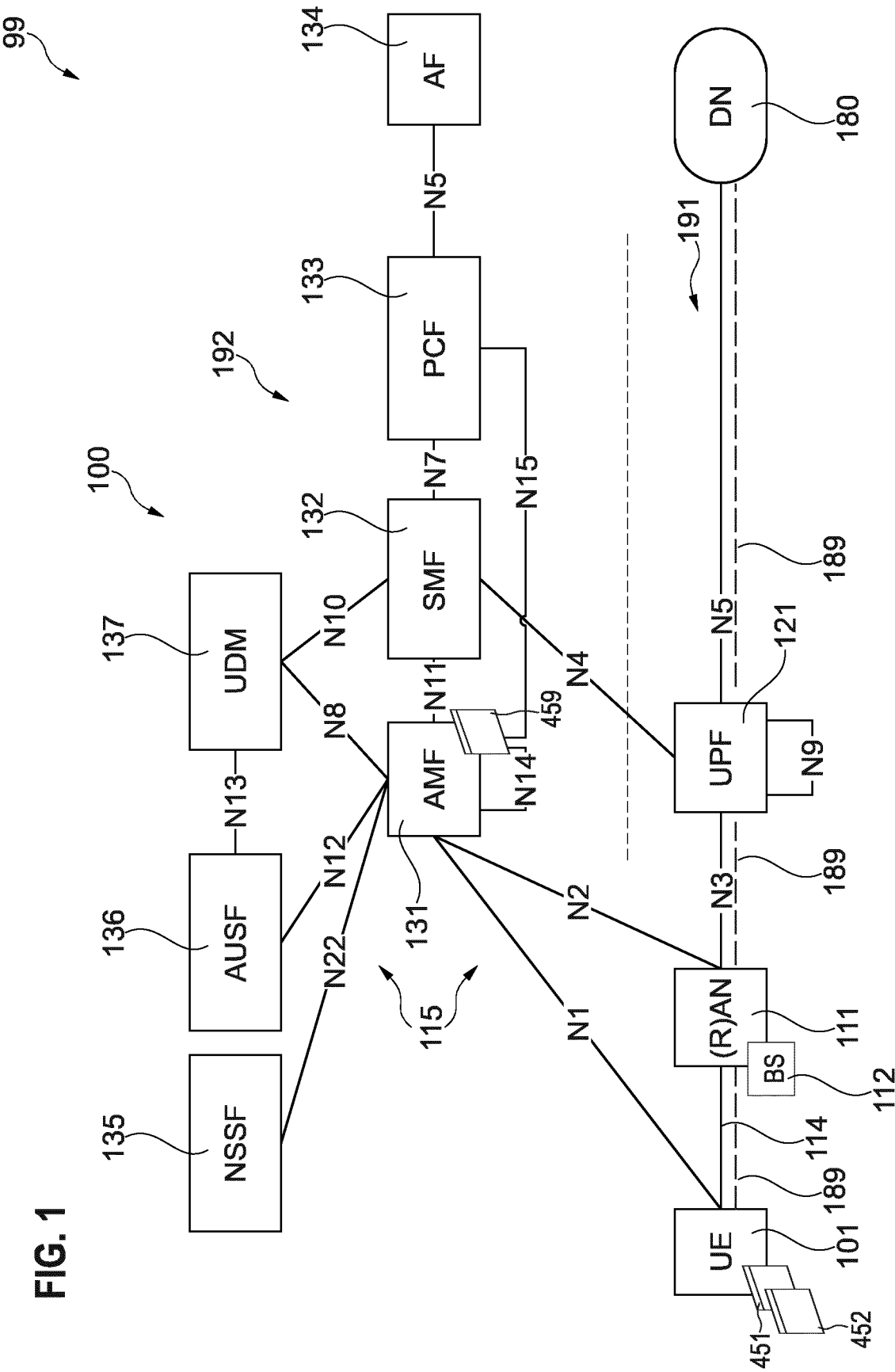
FIG. 1 schematically illustrates a communication network including a UE, a cellular network, and the data network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various examples relate to wireless communication in a communications network. The communications network can include a UE and a cellular network. The communications network can include one or more data networks, e.g., an IP Multimedia Subsystem (IMS) network. The cellular network (NW) can include a radio access NW (RAN) and a core NW (CN). The RAN can include one or more base stations associated with multiple cells. A radio link can be used for communicating signals encoding data between the wireless communications device and the RAN.

The UE can selectively operate in a connected mode or a disconnected mode. These modes are defined in connection with the operation with respect to the cellular network. The modes can be defined, more specifically, with respect to the RAN and optionally the CN. The disconnected mode reduces or even removes communication on a radio link between the UE and the RAN, to thereby reduce the power consumption. To trigger a transition from the disconnected mode to the connected mode, a paging procedure can be used. According to various examples described herein, the paging procedure can include transmission of one or more paging signals. The one or more paging signals can be transmitted at the paging occasion (PO). The PO can be aligned with an ON duration of a discontinuous reception cycle (DRX) implemented by the UEs. The one or more paging signals can include a paging indicator, typically transmitted on a control channel and received using blind decoding. The one or more paging signals can encode a paging message, typically received on time-frequency resources of a time-frequency resource grid indicated by the paging indicator. It is possible that the paging message is indicative of a paging cause. The value of the paging cause can be indicative of the reason of the paging procedure having been triggered by the communications network. Example paging causes can include: incoming data transfer, e.g., an incoming call; measurement request; positioning request; emergency warnings such as ETWS/CMAS warnings; and/or system information; etc. The incoming data transfer is sometimes labeled as mobile-terminating (MT) data transfer.

Various examples described herein relate to wireless communications devices that are capable of connecting to at least one cellular NW using multiple identities of the UE. Such a UE is called a multi-SIM device. According to various examples described herein, the term identity of the UE as used herein may refer to an identity associated with a subscriber associated with the UE, i.e., a subscriber identity (for brevity, hereinafter, this is simply referred to as identity). These identities may include a temporary identity assigned to the UE. For example, such UEs capable of connecting to the at least one cellular NW using one or more identities could comprise multiple SIM chip cards or multiple embedded SIM modules. Hereinafter, such UEs that are capable of connecting to the at least one cellular NW using multiple identities will be referred to as multi-SIM devices. The multiple identities are typically associated with different subscriptions at the respective cellular NW or cellular NWs. Such subscriptions are associated with a unique identity, e.g., the International Mobile Subscriber Identity (IMSI) and a unique service agreement. For example, policies and charging and/or traffic shaping for data transfers such as voice calls, short messaging services and packetized data can be dependent on the respective service model. According to various examples described herein, if the multi-SIM device connects to the at least one cellular NW using a first identity, then a respective IP address, a unique mobile station international subscriber directory number, and a unique data connection with the cellular NW can be provisioned. Then, the multi-SIM device operates in a connected mode with respect to that cellular NW. Typically, while the multi-SIM device operates in the connected mode using the first identity, the multi-SIM device would operate in the disconnected mode using the second identity with respect to the same cellular NW or another cellular NW associated with the second identity. This is, in particular, true for so-called single-radio multi-SIM devices that lack dual transmit and/or receive (transmission) capability.

The POs of the disconnected mode can be aligned with an absence time or paging gap associated with the connected mode of a further identity of the multi-SIM device. It is possible that the paging gaps are provided that correspond to absence times with respect to the cellular NW to which the UE operates in the connected mode; during the absence times, the UE can perform channel measurements with respect to the cellular NW associated with the second identity and/or monitor for one or more paging signals from the cellular NW associated with the second identity. According to various examples described herein, it can be said that a multi-SIM device, from a NW perspective, will be perceived as two independent UEs in typical scenarios.

According to various examples described herein, multi-SIM devices can connect to the same cellular NW or to multiple cellular NWs using the multiple identities. For instance, some scenarios are described herein which relate to a multi-SIM device connecting to multiple cellular NWs; but the techniques may also be applicable to scenarios in which the multi-SIM device connects to one and the same cellular NW using multiple identities.

Various techniques are based on the finding that when a UE—e.g., a single-SIM UE or a multi-SIM device—is being paged, there can be various reasons for the UE preferring to or being unable to transition from the disconnected mode to the connected mode in response. The UE can be busy. Some examples of such busy events are listed below in table 1.

TABLE 1

Examples of busy events that can trigger transmitting a response message associated with a paging message, the response message being indicative of the UE being temporarily unable to respond. It is possible that multiple such busy events are encountered in a cumulative manner at a given time.

| Example | Busy Event | Description |
|---------|------------|-------------|
| A | In connected mode using another identity | A multi-SIM device may be operating in a connected mode using another identity than the identity associated with the paging. In particular, for single-radio multi-SIM devices, this may limit the ability of responding immediately to the paging and engage in further connection associated with the paging. |
| B | Cell-edge scenario | A UE may detect that it is located close to the edge of a cell of the RAN of the cellular NW. This makes it likely that the UE will be soon moving into the coverage area of an adjacent cell. Accordingly, it can be beneficial to wait until such mobility with respect to the adjacent cell has been completed. The UE may be aware of its mobility status to determine the cell-edge scenario. |
| C | Reduced radio quality | The radio link between the UE and the cellular NW may suffer from poor quality. For instance, a path loss or noise may be significant. In such scenarios, it can be beneficial to wait until the radio quality has improved. |
| D | Reduced processing capabilities | For illustration, it would be conceivable that the UE is temporarily experiencing reduced available processing capabilities. For instance, a memory-intensive application may be executed; then, responding to the paging by triggering the transition into the connected mode may be inappropriate. For instance, the state of charge of the battery may run low. |
| E | Overheating | For example, it would be conceivable that the UE temporarily experiences an increased operating temperature, e.g., of control circuitry. This can be due, e.g., due to a significant processing workload (cf. example D). |

Various techniques facilitate buffering of control information associated with a data transfer (data-transfer control information) that has triggered the paging procedure in response to determining that the UE is being being unable to engage in the data transfer. One cause for the UE being unable to engage in the data transfer can be that the UE encounters one or more busy events. The UE can be unresponsive.

According to various examples described herein, various options are conceivable to determine that the UE is being unable to engage in the data transfer. Examples of such options are provided in TAB. 2.

TABLE 2

Example options for implementing a decision criterion to determine whether a UE is able to engage in a data transfer or is unable to engage in a data transfer. A reason for the UE being unable to engage in a data transfer can be one or more of the busy events according to TAB. 1 being encountered at the UE. Another reason could include the UE being unreachable.

| Example | Decision criterion to determine that the UE is being unresponsive | Details |
|---------|------------------------------------------------------------------|---------|
| A | Response message associated with a paging message | One option can rely on a response message associated with the paging message, the response message being indicative of the UE being temporarily unable to respond to the incoming data-transfer. |
| B | Timeout regarding response to incoming data transfer | Another option may rely on determining a timeout with respect to not receiving any trigger from the UE associated with the incoming data-transfer. For illustration, a session control node of the data transfer may monitor whether any packets are received from the UE that are directed to an originator of the data-transfer, within a certain time duration. For example, a timeout time duration may be determined depending on requirements associated with the data-transfer. For example, it would be possible to monitor traffic in the UP to detect packets of the data transfer between the UE and the originator of the data transfer; as such packets of the data transfer are detected, then the UE has reacted to the data transfer and the UE can be judged to be responsive. |

The buffering can take place at one or more nodes of the communications NW. More specifically, the buffering can take place at a session control node of the communications NW.

According to various examples described herein, the session control node configured to buffer the data transfer control information may be a control node of the CN of the cellular NW. Also, the session control node may be implemented by a data plane gateway of the CN of the cellular NW. In yet further examples, the session control node may be implemented by a base station of the RAN. In yet further examples, the session control node could be implemented by a node of a data network connected to the cellular network, e.g., an IMS node.

The buffering of the data transfer control information can extend over a duration of time. For instance, the duration of time can be longer than 30 seconds, optionally longer than 1 minute, further optionally longer than 10 minutes. The buffering can extend until the at least one busy event is resolved. The buffering can extend until expiry of a discard timer. More specifically, the buffering can extend beyond completion of a paging procedure. Accordingly, this buffering can also be referred to as "extended buffering", because the extends beyond completion of the paging procedure. It is even possible that the buffering of the data-transfer control information extends beyond a latency time associated with the data transfer. For illustration, the data transfer may be valid for seconds (e.g., as would be in the case of an incoming call, until the originator of the incoming call hangs up), but the data-transfer control information may be buffered for minutes or even tens of minutes. Then, by buffering the data-transfer control information, it is possible to get an indication of who has called.

According to various examples described herein, the data-transfer control information that is buffered can be significantly smaller in size than the payload data of the data transfer, e.g., payload data packets. For instance, the data transfer control information could be indicative of one or more parameters of the data transfer. Such parameters can put the UE in the position to re-initiate/commence the data transfer. A further data transfer, different from the initial data transfer, may be set up, e.g., by the UE. The further data transfer may carry information associated with the initial incoming data transfer. This helps to deliver information associated with the data transfer at a later point in time, upon the at least one busy event being resolved. Some examples of information content of the data transfer control information: originator of the data transfer; content of the data transfer, e.g., application type, voice call, video call, call, etc.; priority of the data transfer; expiry time of the data transfer; cryptographic material—e.g., a certificate or a cryptographic keying material—associated with an encryption of packetized data of the data transfer; to name just a few.

It is then possible to provide the buffered data-transfer control information associated with the data transfer to the UE, when the at least one busy event is resolved. Thereby, the UE can be informed on details of the data transfer that could not be responded to earlier, because of the at least one busy event. For example, in case the data transfer is a call—e.g., a voice call or a video call—the respective data-transfer control information—then referred to as call control information—can be used by the UE to trigger an outgoing call to an originator of the incoming call. More generally speaking, the UE can trigger a further data transfer towards the originator of the incoming data transfer, based on the data-transfer control information. This is why it is helpful to extend the buffering of the data-transfer control information, e.g., even beyond the paging procedure or the validity of the incoming data transfer.

The techniques described above are illustrated using an example below, specifically for a scenario in which the incoming data transfer is implemented by an incoming call: Firstly, triggered by a paging message that is indicative of an incoming call and that has been received from the communications NW, the UE can transmit a response message responding to the paging message. The response message can be transmitted to a node of the core NW of the cellular communications NW. This response message can be transmitted upon detecting a least one busy event. The response message can be indicative of the UE being temporarily unavailable to respond to the incoming call—or, more generally, to engage in a data transfer. For example, the response message can include a busy indicator. The response message can include an indicator indicative of a predicted time duration for which the UE will be unable to respond to the incoming call. For example, a scenario would be conceivable in which the UE is a multi-SIM device. Here, the at least one busy event can include the UE operating in a connected mode using a further identity that is different from the identity associated with the paging message. Then, the response message could be indicative of the time estimate for how long the UE will be busy using the further identity.

Generally speaking, the response message being indicative of the UE being temporarily unavailable to respond to the incoming call can indicate to the communications NW that the UE may take responsive actions to the paging message, or more specifically the incoming call, at a later time or a later stage. In a scenario in which the response message is indicative of the predicted time duration for which the UE will be unable to respond to the incoming call, it would be possible that such a time is estimated based on e.g., settings in the UE. For example, a predefined lookup table may be relied upon which includes respective values for the predicted time, e.g., based on the type of busy event, the type of application associated with a data transfer supported by the connected mode using the further identity, based on a real-time estimate of the remaining time of the data transfer (e.g., based on a remaining size of packetized data to be transferred), or even real-time user interaction based on a user query where the user can select, e.g., a certain time duration expressed in minutes from a dialogue window. The node receiving the response message can then record that the UE was not reachable due to being busy. The node receiving the response message can record the estimated time for when the wireless communications device will become "non-busy" or reachable again. It would be possible that the node receiving the response message forwards this information to another node, e.g., a session control node or a node in a IMS NW, e.g., a session control node of the incoming call. Based on the response message being indicative of the UE being temporarily unavailable to respond to the incoming call, it is then possible to implement extended buffering of the data-transfer control information, here implemented by call control information. For illustration, such extended buffering may be only applicable to certain types of the data transfer. For instance, it would be conceivable that extended buffering is selectively activated for voice or video calls. Decision criteria for selectively activating the extended buffering may include: type of the data transfer (e.g., the extended buffering may only be activated for calls, but not for other types of data transfers), policies associated with a subscriber, e.g., subscriber level; predefined settings associated with the subscriber; etc. For instance, the data transfer may correspond to an incoming call. The incoming call may be implemented according to the Session Initiation Protocol (SIP). The SIP is described, e.g., in The Internet Society, Request for Comments: 3261 (2002) by Rosenberg et al. In such a scenario, the Invite message received from an originator of the call could be buffered as call control information. It would also be possible to extract information from the SIP Invite message, e.g., the address of the originator of the incoming call. For instance, in a scenario in which the SIP Invite message is buffered, it would be possible to label the SIP Invite message as having been buffered. For example, a respective indicator may be incorporated into a header of the SIP Invite message. It would also be possible to provide a separate indicator linked with the SIP invite message. Similar explanations also apply to other types of buffered call control information. Generally, such a label indicative of the data-transfer control information having been buffered may be included in the data-transfer control information may be provided separately. Once the UE is available again—i.e., all busy events previously preventing the UE from accepting the incoming call directly have resolved —, the UE can request the buffered call control information from the communications NW. A respective request message can be transmitted. This could be a Service Request message. The request message could reference to the response message previously transmitted and being indicative of the UE being temporarily unavailable to respond to the incoming call. The request message could also directly reference to the incoming call or, more generally, to mobile-terminating data. For example, the request message could reference to the extended buffer of the mobile-terminating data at the communications NW. Thereby, the communications NW is informed that the UEs now prepared to receive the call control information.

Based on this request message, the particular node at the communications NW that is buffering the call control information gets notified that the UE is now operating in the connected mode and able to receive data. Then, the buffered call control information is provided to the UE. This can be provided along with the label of the call control information having been buffered. The UE, upon receiving the call control information and determining that the call control information has been buffered for the extended time duration, will not respond to the incoming call directly. For instance, it would be possible to check the identity of the caller. For example, in a scenario in which the call control information is implemented by the SIP Invite message, the UE can refrain from answering to that SIP Invite message directly. Rather, the UE can optionally trigger an outgoing call to the originator of the incoming call based on the call control information. One or more decision criteria for whether to trigger the outgoing call not are conceivable. Example decision criteria include: a time duration, e.g., for which the call control information has been buffered; or a user query (e.g., a manual interaction with the user of the UE). For example, the user could be prompted via a respective user interface to indicate whether the user would like to place the outgoing call.

Above, a scenario has been described in the context of the data transfer being implemented by an incoming call. Concepts described above can be readily applied to other kinds and types of incoming data transfers directed to the UE.

FIG. 1 schematically illustrates a communications NW 99, including a UE 101, a cellular NW 100, and a data network (DN) 180, e.g., an IMS NW. The example of FIG. 1 illustrates the cellular NW 100 according to the 3GPP 5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc.

The UE 101 is a multi-SIM device 101: the UE 101 is capable of connecting to one or more cellular NWs (in FIG. 1 only a single cellular NW is illustrated)—using two identities 451, 452. The identities 451, 452 can be static e.g. SUPI/IMSI or temporary, e.g., a Temporary Mobile Identity (TMSI). Each one of the multiple identities 451, 452 can be implemented by a respective SIM such as a USIM.

The UE 101 is connectable to a CN 115 of the cellular NW 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101. The wireless link 114 can include one or more spatial streams to carry data over the air. The wireless link 114 can also be labeled radio channel.

The wireless link 114 (or radio link) implements a time-frequency resource grid. Typically, Orthogonal Frequency Division Multiplexing (OFDM) is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different timefrequency resource elements can be allocated to different logical channels or reference signals of the wireless link 114. Examples include: Physical Downlink Shared Channel (PDSCH); Physical Downlink Control Channel (PDCCH); Physical Uplink Shared Channel (PUSCH); Physical Uplink Control Channel (PUCCH); channels for random access; etc.

The wireless link 114 of the cellular NWs to which the UE 101 connects using its multiple identities 451, 452 can be different from each other, e.g., use different frequencies, different modulation and/or coding, etc. There can be a frequency offset between the carrier frequencies of the wireless links 114 of the multiple NWs.

The CN 115 includes a user plane (UP) 191 (oftentimes also referred to as data plane, DP) and a control plane (CP) 192. Application data of a data transfer is typically routed via the UP 191. A data transfer can be associated with transmission of payload data. For instance, this could be a call or payload data of another application. The data transfer can be characterized by an originator. The data transfer can be between two terminal nodes, e.g., identified in headers of respective data packets. The data transfer can include multiple data packets. The data transfer can be associated with a dedicated bearer. For this, there is provided a UP function node (UPF) 121. The UPF 121 may implement router functionality. The UPF 121 implements a gateway node. Application data may pass through one or more UPFs 121. In the scenario of FIG. 1, the UPF 121 acts as a gateway with respect to a data NW 180, e.g., the Internet or a Local Area NW or an IMS NW. Application data of a data transfer can be communicated between the UE 101 and one or more servers on the data NW 180.

The cellular NW 100 also includes a mobility-control node, here implemented by an Access and Mobility Management Function (AMF) 131 and a Session Management Function (SMF) 132.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization. For example, the AMF 131 controls CN-initiated paging of the UE 101, if the respective UE 101 operates in a disconnected mode. Hence, the AMF 131 implements a paging-control node. The paging-control node can control and trigger paging procedures of the UE 101. The pagingcontrol node for this purpose can track a mobility of the UE 101. The paging-control node can manage a connection of the UE 101 with the cellular NW 100. The AMF 131 may trigger transmission of paging signals to the UE 101; this may be time-aligned with POs. After UE registration to the NW, the AMF 131 creates a UE context 459 and keeps this UE context, at least as long as the UE 101 is registered to the NW. The UE context 459 can hold one or more identities of the UE 101, e.g., temporary identities used for paging as described herein. The AMF 131 also provides the UE 101 with a temporary identity, the TMSI or S-TMSI, or even a paging-related identity as described in further below. The UE context may also hold a timing offset between POs of multiple NWs to which the UE is attached. The UE context may also hold a timing for paging the UE, e.g., expressed in milliseconds.

A data connection 189—that can be used to support a data transfer, i.e., deliver application data of the data transfer—is established by the SMF 132 if the respective UE 101 operates in a connected mode. Accordingly, the SMF 132 can implement a session control node. The data connection 189 is characterized by UE subscription information hosted by the UDM 137. To keep track of the current mode of the UE 101, the AMF 131 sets the UE 101 to CMCONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 via the RAN 111 and the UP 191 of the CN 115 and towards the DN 180. Gateway nodes such as the UPF 121 can thus also implement session control nodesof the data transfer carried by the data connection 189. For example, a connection with the Internet or another DN 180 can be established. To establish the data connection 189, i.e., to connect to the cellular NW 100, it is possible that the respective UE 101 performs a random access (RACH) procedure, e.g., in response to reception of a paging signal. The data connection 189 may include one or more bearers such as a dedicated bearer or a default bearer. The data connection 189 may be defined on the RRC layer, e.g., generally Layer 3 of the OSI model.

While in the scenario FIG. 1 a multi-SIM device 101 as illustrated, According to various examples described herein, various techniques described can be applicable to single-SIM UEs, as well. Nonetheless, further details with respect to the multi-SIM device 101 are described in connection with FIG. 2.

Figure 2:
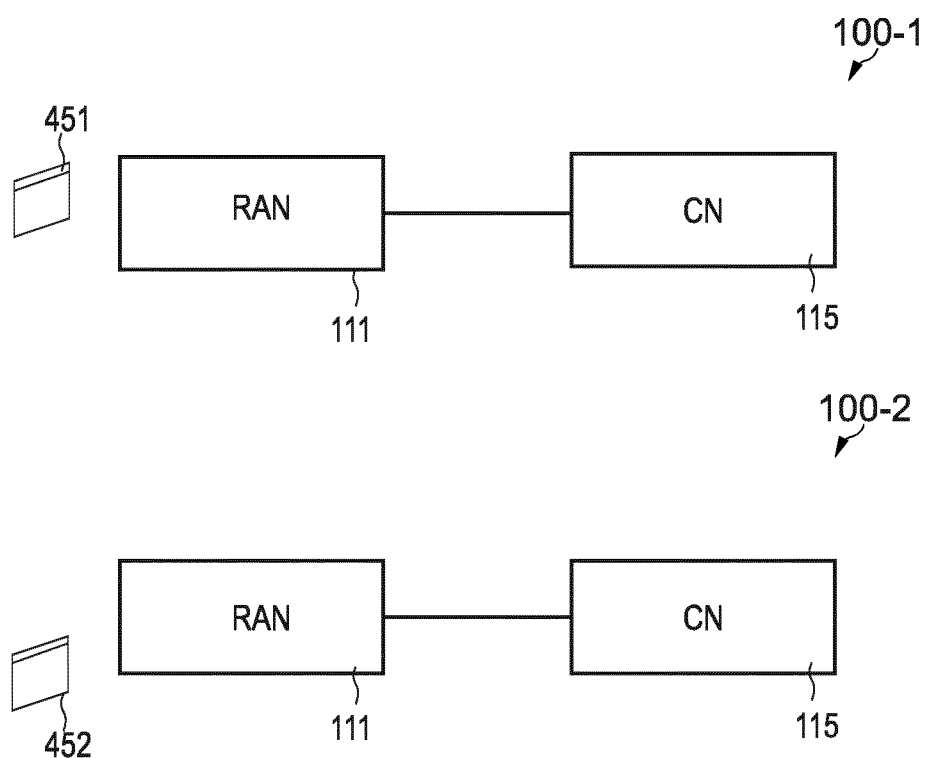
FIG. 2 schematically illustrates multiple subscriber identities of a multi-SIM device being associated with multiple cellular networks according to various examples.

FIG. 2 describes aspects with respect to operation of the multi-SIM device 101. The multiSIM device 101 is configured to communicate with two cellular NWs 100-1 and 100-2. Each of the cellular NWs 100-1 and 100-2 includes a respective RAN 111 and the respective core NW 115. The multi-SIM device 101 uses the first identity 451 to communicate with the cellular NW 100-1 and uses the second identity 452 to communicate with the cellular NW 100-2.

Fora single-radio multi-SIM device 101 the wireless interface is capable of transmitting and receiving signals on only one of the radio links towards the RANs 111 of the cellular NWs 100-1 and 100-2 at a given moment in time.

For example, when operating in a connected mode with respect to the cellular NW 100-1, paging gaps used as absence times may be defined that enable the UE 101—then operating in the disconnected mode with respect to the cellular NW 100-2—to monitor for paging signals of a paging procedure associated with the second identity 452 and transmitted by the RAN 111 of the cellular NW 100-2 during respective absence times. This also applies vice versa. Such absence times can also be used to transmit messages in response to a paging message to the respective cellular NW.

During the paging gaps, it would be possible to perform channel measurements with respect to the cellular NW 100-2, e.g., in addition or as an alternative to monitoring for the paging signals of the paging procedure associated with the second identity 452.

During the absence times with respect to the cellular NW 100-1, the UE may not be required to transmit and/or receive signals to or from the cellular NW 100-1.

Details with respect to the connected mode and the disconnected mode are also illustrated in connection with FIG. 3.

Figure 3:
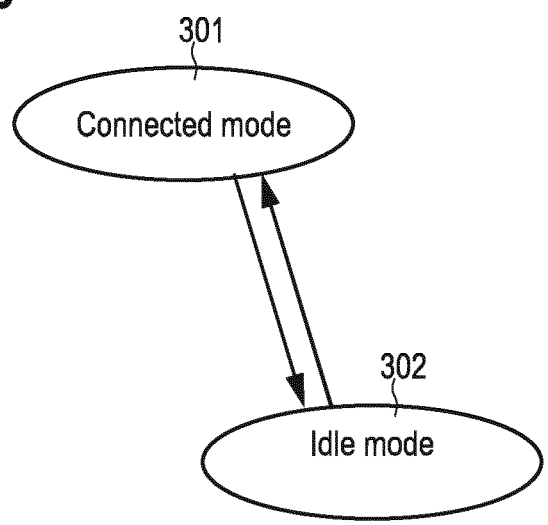
FIG. 3 illustrates multiple operating modes of the UE according to various examples.

FIG. 3 schematically illustrates aspects with respect to multiple modes 301-302 in which a UE, e.g., the UE 101 of FIG. 1, can operate. A connected mode 301 is characterized by an established data connection 189, e.g., used to support a data transfer such as a call. Packetized data of the data transfer can be routed along the data connection 189, e.g., by referencing to an identifier of the data connection 189. During a disconnected mode—here, implemented by the idle mode 302 (another example would be an inactive mode, defined at the RAN 111—the data connection 189 is not established. The connected mode 301 and/or the idle mode 302 can include DRX operation. The data connection 189 may be characterized by a context information. During the connected mode 301, the context information may be kept up-to-date; during the idle mode 300 and to the context information may be discarded. Thus, to be able to deliver packets of the data transfer, it may be required to set up the data connection 189.

To trigger the transition from the disconnected mode to the connected mode 301, it is possible to perform a random access procedure. The random access procedure can be triggered by various trigger events such as mobile originating (MO) data or Mobile Terminated (MT) data, then indicated by paging the UE.

A release message triggers the transition from the connected 301 to the disconnected mode.

Figure 4:
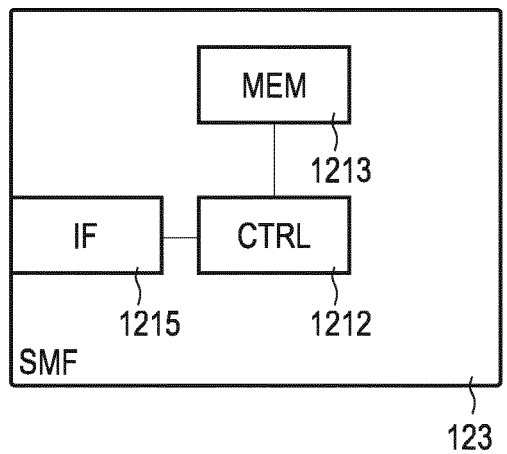
FIG. 4 schematically illustrates a session-control node of a cellular network according to various examples.

FIG. 4 schematically illustrates aspects with respect to the SMF 132 The SMF 132 can implement a session control node.

According to various examples described herein, a session control node of a data transfer is involved in the handling of the data transfer. This can include forwarding application data of the data transfer and/or control messages of the data transfer as a gateway node, or control of such a gateway node.

The SMF 132 includes a control circuitry 1212 and a memory 1213. The control circuitry 1212 can load program code from the memory 1213. The program code can then be executed by the control circuitry 1212. The SMF 132 also includes an interface 1215. The SMF 132 can communicate with other nodes (cf. FIG. 1) via the interface 1215. When the control circuitry 1212 executes the program code, it can perform one or techniques described herein, e.g.: determining that a UE being the intended recipient of an data transfer being temporarily unable to engage in the data transfer, e.g., based on a respective indicator received from a paging control node executing a paging procedure for the UE; buffering data-transfer control information associated with the incoming data transfer, e.g., while a UE associated with the data transfer is being paged by the paging control node and after the paging procedure has concluded, e.g., in response to the determining that the UEs being temporarily unable to engage in the data transfer; when completing said buffering, facilitating provisioning of the data-transfer control information to the UE; labelling the data-transfer control information so that it is indicated that the data-transfer control information has been buffered, e.g., by including a respective indicator in the data-transfer control information, e.g., in a header thereof, or by provisioning a separate indicator referencing to the data-transfer control information; and/or upon detecting a discard event, discarding the buffered data-transfer control information; etc.

While FIG. 4 illustrates a SMF 132 is an example of a session control node, aspects discussed in connection with FIG. 4 can be readily applied to other kinds and types of session control nodes. Other examples of session control nodes would include: the UPF 121, a base station 112, a node of the DN 180.

The SMF 132 is only one example of a session control node. Other implementations of the session control node are conceivable. For example, the session control could be implemented by a node of the IMS NW 190 or another data NW connected to a cellular NW 100, 100-1, 100-2 (cf. FIG. 1). Thus, different nodes along the path of the data transfer— e.g., defined by the data connection 189 through the user plane 191 could be implementing the buffering of the data-transfer control information.

Figure 5:
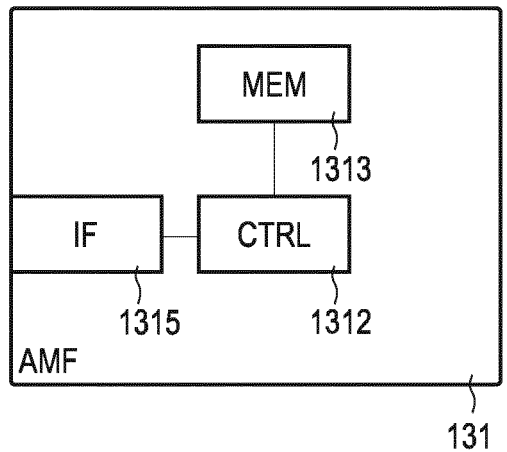
FIG. 5 schematically illustrates a paging-control node of a cellular network according to various examples.

FIG. 5 schematically illustrates aspects with respect to a paging control node, here implemented by the AMF 131. The AMF 131 includes control circuitry 1312 and a memory 1313. The control circuitry 1312 can load program code from the memory 1313. The program code can then be executed by the control circuitry 1312. The AMF 131 also includes an interface 1315. The AMF 131 can communicate with other nodes (cf. FIG. 1) via the interface 1315.

When the control circuitry 1312 executes program code, it can perform one or more techniques described herein, e.g.: triggering a paging procedure of a UE, e.g., in response to receiving an indication of the data transfer being scheduled for delivery from a session control node; receiving from the UE a response message that is indicative of the UE being temporarily unable to respond to the data transfer; providing an indicator indicative of the UE being temporarily unable to engage in the data transfer to the session control node; starting and aborting a paging procedure; and/or escalating paging within multiple cells, e.g., forming a tracking area or a set of tracking areas or a registration area; etc.

FIG. 5 illustrates the AMF 131 as a paging control node. In other scenarios, it would be possible that other nodes implement respective functionality. For illustration, in a 3GPP NR RRC Inactive mode, paging can be controlled by a base station 112 that then implements the paging control node. Concepts and aspects discussed in connection with FIG. 5 can be readily applied to other kinds and types of paging control nodes.

Figure 6:
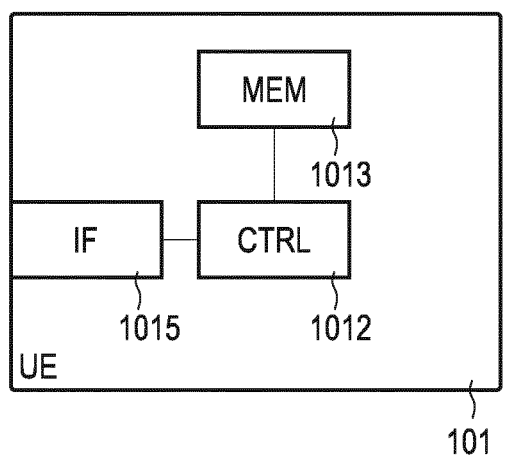
FIG. 6 schematically illustrates a UE according to various examples.

FIG. 6 schematically illustrates aspects with respect to the UE 101. The UE 101 includes control circuitry 1012 and a memory 1013. The control circuitry 1012 can load program code from the memory 1013. The program code can then be executed by the control circuitry 1012. The UE 101 also includes an interface 1015. The UE 101 can communicate with other nodes (cf. FIG. 1) via the interface 1015.

The interface 1015 can include a radio interface to communicate on the wireless link 114 with a base station 112. The radio interface can include one or more transmitter chains and/or one or more receiver chains. For instance, the radio interface could include a single transmit chain and a single receiver chain, referred to as a single radio. The interface 1015 could be capable to communicate using multiple identities, making the UE 101 a multi-SIM device.

When the control circuitry 1012 executes the program code, it can perform one or techniques as described herein, e.g.: operating in a connected mode (cf. FIG. 3: connected mode 301); operating in a disconnected mode (cf. FIG. 3: idle mode 302); transitioning from the connected mode to the disconnected mode and vice versa; while operating in the disconnected mode, monitoring for paging signals, e.g., by blind decoding a Physical Downlink Control Channel (PDCCH) to detect the paging indicator and, upon detecting the paging indicator, attempting to receive a paging message on resources indicated by the paging indicator; checking whether a paging message is directed towards an identity associated with the UE 101; checking a cause value of the paging message, e.g., checking whether the cause value is indicative of an incoming call or another incoming data transfer; detecting one or busy events, upon receiving a paging message; transmitting a response message associated with the paging message, the response message being indicative of the UE being temporarily unable to respond to an incoming data transfer, e.g., by including a respective indicator (busy indicator) in the response message and optionally by including an indicator indicative of a predicted time duration for which the UE will be unable to respond to the incoming data transfer; obtaining data transfer of control information associated with the incoming data transfer from the communications NW, e.g., upon resolution of the respective busy events previously triggering transmission of the response message that is indicative of the UE being temporarily unavailable to respond to the incoming data transfer; and/or commencing the incoming data transfer, e.g., by triggering a further data transfer, such as an outgoing call, with an originator of the incoming data transfer; etc.

Figure 7:
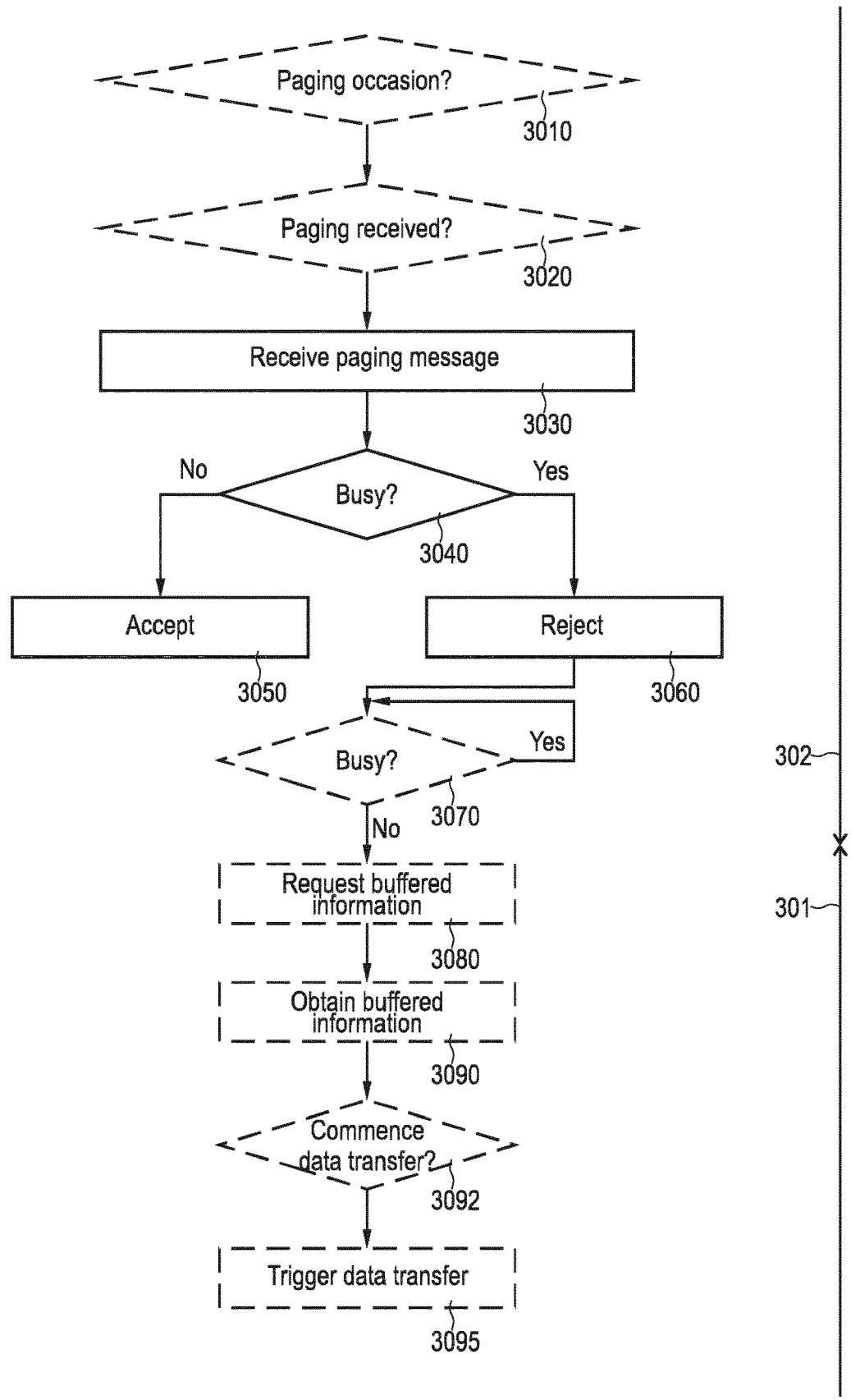
FIG. 7 is a flowchart of a method according to various examples.

FIG. 7 is a flowchart of a method according to various examples. The method of FIG. 7 can be executed by a UE, e.g., a single-SIM UE or a multi-SIM device. For instance, the method of FIG. 7 could be executed by a single-radio multi-SIM device. The method of FIG. 7 could be executed by the UE 101 (cf. FIG. 6). The method of FIG. 7 illustrates a behavior of the UE responsive to paging.

Optional boxes are labelled with dashed lines in FIG. 7.

At box 3010, the UE can check whether there is a PO commencing. Paging signals of a paging procedure can be transmitted to the UE during the PO. A repetitive timing of the PO can be predefined. For instance, the repetitive timing could depend on the identity associated with the paging. For illustration, the check at box 3010 could involve determining whether a paging gap commences: e.g., for a multi-SIM device, the paging gap may be aligned with then absence time from communicating on a radio link using a further identity. The check at box 3010 could, alternatively or additionally, also be based on an on duration of a discontinuous reception cycle.

Once it is determined that a PO commences, at box 3020, the UE can monitor for paging signals. For example this can include attempting to receive (monitor) a paging indicator on the PDCCH and, upon receiving the paging indicator, monitoring for a paging message on the PDSCH. Thus, at box 3020, it is checked whether one or more paging signals are received.

Then, at box 3030, the UE can receive a paging message. The paging message can be indicative of an incoming data transfer. For example, the paging message could be indicative of an incoming call in one example of the data transfer. For instance, a type of application associated with the incoming data transfer may be indicated by a cause value included in the paging message.

Then, at box 3040, UE can check whether one or more busy events are encountered. For instance, presence of one or more busy events as described in TAB. 1 above could be checked. Example busy events include the UE operating in a connected mode using a further identity different from the identity associated with the paging message received at box 3030. Another example of a busy event would include a cell-edge coverage scenario and/or a reduced radio quality scenario.

If there are no busy events presently encountered, then the method commences at box 3050. Here, the UE can accept the paging, e.g., by transitioning from the disconnected mode (cf. FIG. 3: idle mode 302) to the connected mode. This can include a random access procedure.

Otherwise, the method commences at box 3060. At box 3060, upon detecting at least one busy event at box 3040, the UE rejects the paging. This can include, e.g., transmitting a response message associated with the paging message, the response message being indicative of the UE being temporarily unable to respond to the incoming data transfer. For illustration, in a scenario of a multi-SIM device, the response message could be transmitted during an absence time of the connected mode using the further identity. According to various examples described herein, it would be possible that the absence time during which the response message is transmitted at box 3060 is the same absence time as the absence time during which the paging messages with received at box 3030, or a subsequent absence time, e.g., the next absence time according to a repetitive timing schedule.

According to various examples described herein, to transmit the response message (cf. FIG. 10, 5035) it may not be required to transition into a connected mode using the respective identity of the UE. For example, it would be possible that the response message is transmitted as an early data transfer, e.g., piggybacked to a message of a random access procedure, wherein the random access procedure can be subsequently aborted. It would be possible that the response message is transmitted in a contention-based manner on shared resources. It would be possible that the response message is transmitted in allocated resources as indicated by the paging message, e.g., on the PUSCH. The response message could also be transmitted in resources that are preconfigured using another message, e.g., according to a concept referred to as Preconfigured Uplink Resources (PUR) where resources are preconfigured for the UE to use when operating in the idle mode.

The response message may be implicitly indicative of the UE being temporarily unable to respond to the incoming call, i.e., being temporarily busy. It would also be possible that the response message includes an explicit indicator (busy indicator). I.e., the information content of a respective information field may be set accordingly.

In some examples, would be possible that the response message includes an indicator indicative of a predicted time duration for which the UE will be unable to respond to the incoming data transfer. For illustration, the predicted time narration may be indicated in absolute terms with reference to a codebook. A typical duration of the predicted time duration may be in the order of tens of seconds or even minutes.

According to various examples described herein, there are various options available for determining the predicted time duration. In one example, it would be possible to monitor for a data transfer supported by a connected mode using a further identity for a multi-SIM device. For instance, an average data rate of the data transfer could be checked and compared against a remaining size of data to be transferred and based on such considerations, it would then be possible to estimate the predicted time duration based on said monitoring. Another option for estimating the predicted time narration can rely on a user query. For example, a user interface of the UE may be controlled to pertain user feedback on an approximated time until resolution of the one or busy events. For a cell-edge scenario or a reduced radio quality scenario, a mobility level of the UE could be taken into account: for higher mobility, it is likely that the predicted time duration is shorter.

At box 3070, it is checked whether the at least one busy event is persistent. For instance, this can involve performing the same check as executed at box 3040. Box 3070 can be repeated from time to time, until the busy event has resolved.

Then, at box 3080, data-transfer control information that has been buffered at the communications NW upon receiving the response message at box 3060 is requested.

For example, an explicit request message can be transmitted. Alternatively to the explicitly requesting the data-transfer control information, it would also be possible to simply connect to the cellular NW by transitioning to the connected mode; this can serve as an implicit indication to the cellular NW that the data-transfer control information should be provided to the UE.

In a scenario in which a request message is transmitted, the request message could be a higher-layer control message, e.g., implementing a service request. Thus, it would be possible that the request message is transmitted after resolution of the at least one busy event, and, furthermore, upon transitioning from the disconnected mode to the connected mode.

This transition is also illustrated in FIG. 7 by referencing to the idle mode 302 and the connected mode 301. In another example, it would be possible that the service request message is transmitted as an early data transfer, e.g., piggybacked to a random access message 2 of a 4-step random access procedure.

The request message can reference to the response message transmitted at box 3060 or include a respective indicator indicative of the data transfer also indicated by the paging message 3030 (i.e., copy the paging cause value) or include a respective indicator that is indicative of the UE requesting provisioning of the data-transfer control information that has been buffered. For illustration, a reference to an extended buffer of MT data at the communications NW and be made.

Then, at box 3090, the buffered data-transfer control information is obtained at the UE. A respective message including the data-transfer control information can be received via the wireless link 114.

It is possible that the data-transfer control information is labelled as having been buffered.

According to various examples described herein, various options are conceivable to label the data-transfer control information as having been buffered. Some of these examples are summarized below in TAB. 3.

TABLE 3 various examples of how to label the data-transfer control information
as having been buffered at the communications NW.
For example, such labels may be assigned once the data-transfer
control information has been buffered beyond a validity or latency
associated with the data transfer. For instance, such
labels may be assigned once the data-transfer
control information has been buffered in response
to receiving an indication that the wireless UE is temporarily
unable to engage in the data transfer or even temporarily busy.

| Example | How to label the data-transfer control information as having been buffered | Description |
| --- | --- | --- |
| A | Embedded indicator | A respective control message carrying or implementing the data-transfer control information can include an indicator-e.g., in the header thereof-that is indicative of the data-transfer control information having been buffered. |
| B | Separate indicator | Instead of embedding an indicator into a control message carrying or implementing the data-transfer control information, it would be possible to separately provide such indication. A respective reference to the data-transfer control information can be made. |
| C | Timestamp | It would be possible that the data-transfer control information is timestamp with respect to the incoming data transfer. Then, by a comparison of the current time with the timestamp, it can be judged that the data-transfer control information has been buffered. |

The UE can tailor the actions to take based on the data-transfer control information in view of the data-transfer control information having been buffered. In particular, different actions may be taken for a scenario in which the incoming data transfer is directly responded to by the UE, vis-à-vis a scenario in which the incoming data transfer cannot be directly responded to by the UE because the UE is temporarily unable to respond to the incoming data transfer.

For illustration, in a case in which the UE directly responds to the incoming data transfer, the UE could accept the incoming data transfer from the originator. Differently, in a case in which the data-transfer control information has been buffered, the UE can establish a further data transfer or trigger establishment of a further data transfer towards the originator of the incoming data transfer. For example, in a scenario in which the data transfer is implemented by an incoming call, it could be checked at box 3092 whether an outgoing call towards the originator of the incoming call is to be triggered and, in the affirmative, this can be executed at box 3095.

According to various examples described herein, various decision criteria can be considered in deciding whether to commence with the incoming data transfer, at box 3092. Example decision criteria can include checking whether a timeout duration has lapsed since receiving the paging message at box 3030 or since sending the response message at box 3060. Alternatively or additionally, a decision criteria could be based on a user query.

As will be appreciated from the foregoing discussion of FIG. 7, it is possible that the UE, triggered by a paging message, responds to the paging message (box 3060) by sending a message, e.g., to the paging control node such as the AMF. This response message can include the busy indicator and, optionally, the time estimate for how long the UE will be busy, e.g., because it operates in the connected mode with respect to another cellular NW using a further identity. It would be possible that the response message transmitted at box 3060 indicates to the communications NW that the UE may take responsive actions to the incoming data transfer at a later stage. In particular, the UE can later on make a query to retrieve the buffered data-transfer control data. A respective cause value may be included in a service request message or a dedicated message to query the data-transfer control information may be implemented. The UE can then obtain the data-transfer control information. For instance by receiving the data-transfer control information in response to a corresponding request, it can be assumed that the data-transfer control information has been buffered. It would also be possible that the data-transfer control information that has been buffered is labelled accordingly, e.g., by setting a respective indicator in a header section thereof.

Details with respect to such a procedure facilitating the buffering of the data-transfer control information will be described next in connection with FIG. 8.

Figure 8:
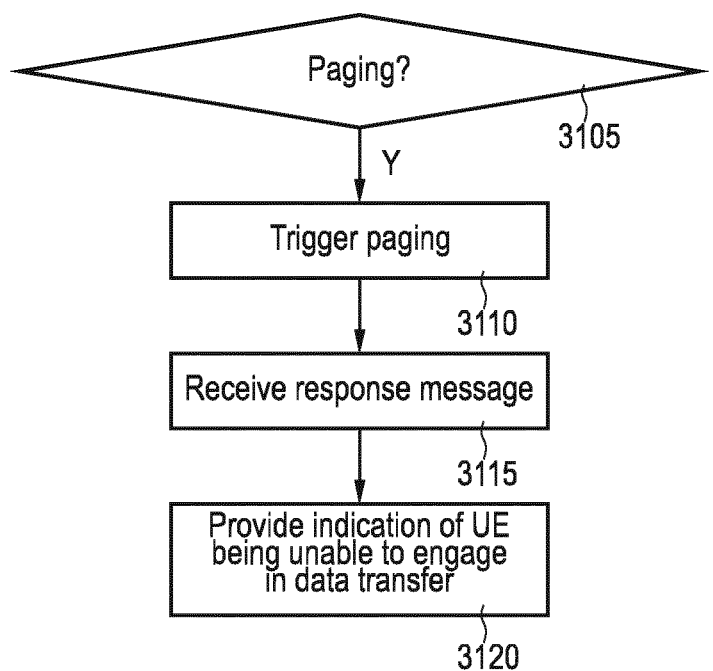
FIG. 8 is a flowchart of a method according to various examples.

FIG. 8 is a flowchart of a method according to various examples. The method of FIG. 8 can be executed by a paging control node, e.g., the AMF (cf. FIG. 1: AMF 131) for CN-initiated paging or a BS 112 for RAN-initiated paging. Optional boxes are labelled with dashed lines in FIG. 8.

At box 3105, the paging control node determines whether paging is required. For instance, the paging control node could determine whether a data transfer is scheduled for a UE. This can be responsive to a respective control message, e.g., received from a gateway node of the UP 191 and/or a session control node such as the SMF (cf. FIG. 1: SMF 132) or a node of a data NW connected to the cellular NW, e.g., a node of the IMS (cf. FIG. 1: data NW 180). It would be possible that such control message is indicative of the type of data transfer. For example, an application could be indicated. For example, it would be possible that it is indicated that the data transfer is an incoming call from an originator.

Next, at box 3110, the paging procedure is triggered. This can include providing a control message to one more base stations 112 of the RAN 111.

A paging escalation of the paging procedure can be implemented, to account for UE mobility.

It would be possible that the paging procedure is triggered and paging messages are used that are indicative of the type of the data transfer, as discussed above in connection with box 3105. For example, the paging messages could be indicative of an incoming call or a website push message or a location-based service message or a social-network message etc., to give some examples of types of data transfers.

Next, a response message may be received from the UE, at box 3115. This response message can be indicative of the UE being temporarily unable to respond to the incoming data transfer. Box 3115, accordingly, is interrelated with box 3060 of FIG. 7. It would be possible that the response message includes a busy indicator. It would be possible that the response message includes an indicator indicative of the predicted time duration for which the UE unable to respond to the data transfer.

Next, at box 3120, an indicator indicative of the UE being unable to engage in the data transfer is provided to one or more session control nodes associated with the data transfer. There are various options of implementing such indicator indicative of the wireless communications device being temporarily unable to engage in the data transfer. Some options are illustrated in TAB. 4.

TABLE 4

Possible implementations of providing an indicator indicative of the UE being temporarily unable to engage in the data transfer from a paging control node to a session control node. Such indicator can facilitate buffering of data-transfer control information at the session control node or a related node. In some examples, it would even be possible to provide no indication that all, i.e., not signal the outcome of the paging procedure.

| Option | Indicator | Explanation |
| --- | --- | --- |
| A | Unsuccessful paging | In one example, the indicator could be indicative of the paging having failed. In other words, one and the same indicator may be used for signaling to the session control node that the UE could not be reached (i.e., no response received at all from the UE, e.g., because the UE has been shut down or is out of coverage), as well as for signaling to the session control node responsive to receiving the response message indicative of the UE being temporarily unable to engage in the data transfer. |
| B | Busy indicator | In contrast to the option A above, different indicators may be used, depending on whether the UE could not be reached at all or whether the UE indicated, by means of the response message, that it is temporarily unable to respond to the data transfer. For the latter case, a busy indicator may be used which is indicative of the UE being unable to respond to the data transfer. |

Also, where available, it would be possible that an indication of the predicted time duration is provided to the session control node. This can be based on a respective indicator provided by the UE (as discussed in connection with FIG. 7: box 3060). For instance, that indicator may be forwarded. This can help the session control node to tailor the buffering.

In response to receiving the response message 3115 that is indicative of the UE being temporarily unable to respond to the data transfer, the paging control node can also abort any escalation of the paging procedure. This means that paging can be stopped. Alternatively or additionally, one or more further paging procedures associated with further data transfers may be blocked. For example, for certain time duration, paging of the wireless communications device may be suspended.

As explained above, such techniques can facilitate buffering of the data-transfer control information at the session control node. Further details with respect to such buffering of the data-transfer control information are described in connection with FIG. 9 below.

Figure 9:
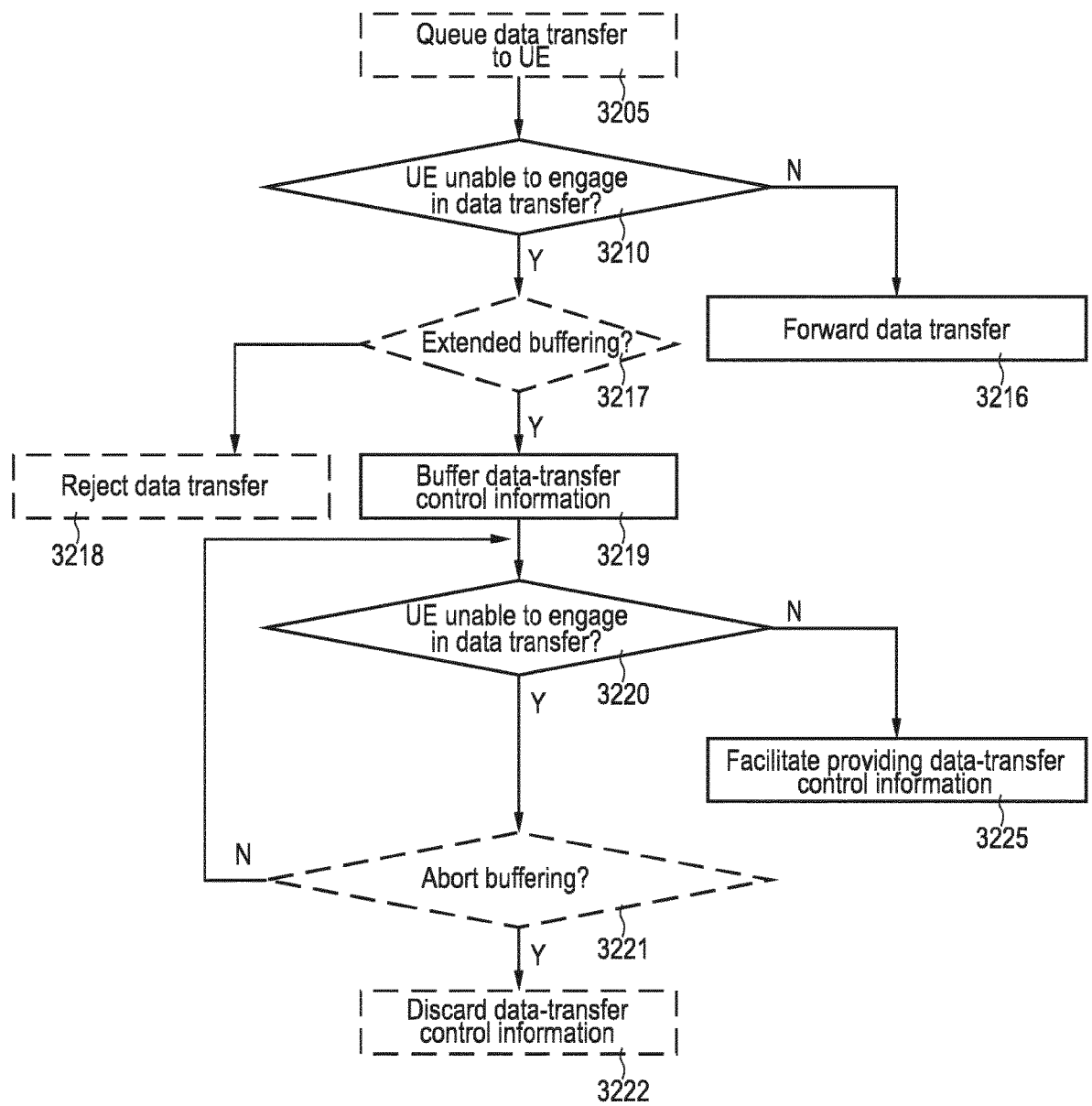
FIG. 9 is a flowchart of a method according to various examples.

FIG. 9 is a flowchart of a method according to various examples. The method of FIG. 9 can be executed by a session control node handling and incoming data transfer directed to a UE. The session control node can be, according to various examples described herein, a CP node or a UP node. An example implementation of the session control node would be the SMF (cf. FIG. 1), the UPF, or a node such as a gateway node of a data NW connected to the cellular NW, e.g., of an IMS NW. Optional boxes are labeled using dashed lines.

At box 3205, a data transfer to the UE is queued. Queueing the data transfer can mean that it is checked whether an existing data connection (cf. FIG. 1: data connection 189) to the UE is set up, i.e., whether the UE operates in the connected mode (cf. FIG. 3: connected mode 301). If this is not the case, then incoming data associated with the data transfer can be stored/buffered, and, at the same time, paging can be requested by transmitting a respective control message to a paging control node (cf. FIG. 8: box 3105).

Next, at box 3210, it is determined whether the UE is unable to engage in the data transfer.

According to various examples described herein, various options are available for implementing box 3210. Some options are summarized in TAB. 5.

TABLE 5

Multiple options for determining that the UE is temporarily unable to engage in the data transfer in view of an incoming data transfer directed to the UE.

| Example | How to determine that the UE is temporarily unable to engage in the data transfer | Details |
| --- | --- | --- |
| A | Timeout | For illustration, it would be possible to consider a timeout time duration, e.g., associated with a response message from the UE indicated to the session control node and/or since requesting the paging control node to trigger the paging procedure of the UE. Upon expiry of the timeout time duration, it can be judged that the UE is temporarily unable to engage in the data transfer. In such a scenario does not required to receive any control signaling from the paging control node. |
| B | UP monitoring | Yet another scenario can relate to monitoring for any payload UP messages being transmitted from/to the UE is a response to the attempted imitation of the incoming data transfer. For example, a SIP invite message indicative of an incoming call can be directed to the UE. Then, the UP can be monitored for SIP response messages directed to the originator of the incoming call or SIP payload packets exchanged between the originator and the UE. If, within a certain amount of time, note UP messages are detected, it can be inferred that the UE is temporarily unable to engage in the data transfer. |
| C | Control signaling from paging control node | In other scenarios, the paging control node may provide an indicator indicative of the UE being temporarily unable to engage in the data transfer, cf. TAB. 4, scenarios A and B. |

Then, depending on the outcome of the check at box 3210, the method commences at box 3216 (if the UE is able to engage in the data transfer) or proceeds at box 3217 (if the UE is unable to engage in the data transfer).

At box 3216, any data associated with the data transfer can be forwarded to the UE. A data connection may have been meanwhile set up, in response to successful paging. The data can be forwarded along the data connection.

At box 3217, an optional check can be made whether to activate or deactivate the buffering of the data-transfer control information. For instance, it would be possible to base decision at box 3217 on the type of the incoming data transfer. For instance, extended buffering may be activated for an incoming call, but may not be activated for an incoming data transfer pertaining to a non-call application, e.g., a social network message.

If buffering is not activated, the data transfer is rejected at box 3218. For illustration, it would be possible to transmit a respective reject message to an originator of the incoming data transfer.

Otherwise, at box 3219, the data-transfer control information can be buffered.

Scenarios are conceivable where the data-transfer control information has already been buffered prior to executing box 3219, i.e., as part of box 3205. Then, the buffering can continue at box 3219.

Furthermore, in some scenarios, at box 3219, the data-transfer control information may be labelled as having been buffered. For illustration, a respective indicator may be set in a header of the data-transfer control information. It would also be possible to provide a separate indicator referencing to the data-transfer control information. Details are explained in TAB. 3.

Optionally, it would be possible to also transmit a reject message to the originator of the incoming data transfer. In some examples, such reject message may include a cause value that is indicative of the buffering being implemented at the session control node. This would enable the originator of the incoming data transfer to understand that it is possible that the UE will possibly initiate a further data transfer associated with the incoming data transfer. According to various examples, it would be possible that the reject message also includes an estimated time at which the UE will initiate the further data transfer. This could be based on a respective timing indication previously obtained from the UE.

At box 3220, distract whether the UE is meanwhile responsive. According to various examples described herein, various options are available to implement the check at box 3220. For illustration, it would be possible to monitor for a respective indicator indicative of the UE becoming responsive from one or other nodes. For illustration, it would be possible to monitor whether a data connection is setup to the UE. Monitoring whether the UE becomes responsive can be, generally, based on control signaling in the CP or based on monitoring the UP. A request may be received from the UE. For example, in one scenario, the UE may transmit a request for the data-transfer control information that can then be received by the session control node.

Then, upon the UE becoming responsive, at box 3220, provisioning of the data-transfer control information to the wireless communications device is facilitated. For instance, data plane routing of the data-transfer control information would be conceivable, e.g., along a data connection then set up. Also, the data-transfer control information could be provided to a mobility control node such as the AMF which could then forward the data-transfer control information to the wireless communications device.

It would be possible that the check at box 3220 is re-executed from time to time, e.g., until a discard event is fulfilled. Accordingly, at box 3221, it is checked whether the buffering of the data-transfer control information is to be aborted. This can mean, that the session control node monitors for a discard event while buffering the call control information. Then, upon detecting the discarded event, the buffered data-transfer control information can be discarded, as explained next. Example discard events are listed in TAB. 6 below.

TABLE 6

Example discard events to be considered when deciding whether to discard the buffered data-transfer control information.

| Example | Discard Event | Details |
|---|---|---|
| A | Timeout | This may include a response timeout without receiving a trigger indicative of the UE being responsive. The timeout could be monitored based on a timer. For illustration, the timer could be set based on an indication previously received from the paging control node indicative of a predicted time duration of the UE being unable to respond to the incoming data transfer, as discussed above in connection with box 3120 and 3060 in the methods of FIG. 8 in FIG. 7, respectively. |
| B | Indication from UE | Another discard criterion could be based on a respective indication received from the UE that it is not intended to commence with the incoming data transfer. |
| C | Release indication | Yet another discarded event can include a release indication received from an originator of the data transfer. |

If the buffering of the data-transfer control information is aborted, then, at box 3222, the datatransfer control information is discarded.

As will be appreciated from the above, it is possible that the AMF informs the session control node that the UE was not reachable due to being "busy". This can be additional information, e.g., different from informing the session control node that the paging has an unsuccessful, i.e., the UE has not been reachable. Then, the session control can decide whether to perform a not perform extended buffering of the data-transfer control information. An example of the data-transfer control information would be buffering of the SIP Invite message. The decision on whether to perform the extended buffering may be due to the received "busy indication". Alternatively, or additionally, the decision can depend on the type of the data transfer, e.g., buffering may be selectively executed for incoming calls. For example, the session control node may decide not to buffer the data-transfer control information, e.g., the UE was unreachable for other reasons, e.g., failed to respond to the page or no battery power or out of coverage. The buffering may commence for a certain predetermined time duration, e.g., based upon the estimated busy time provided by the UE or a default time such as 5 minutes, 10 minutes, etc. It is possible to label the buffered data-transfer control information as having been buffered, in order for the UE to understand that it should not directly respond to, e.g., a respective SIP Invite message. Instead, the UE can take other measures to commence the incoming data transfer, e.g., in case of an incoming call, place an outgoing call to the originator of the incoming call.

Figure 10:
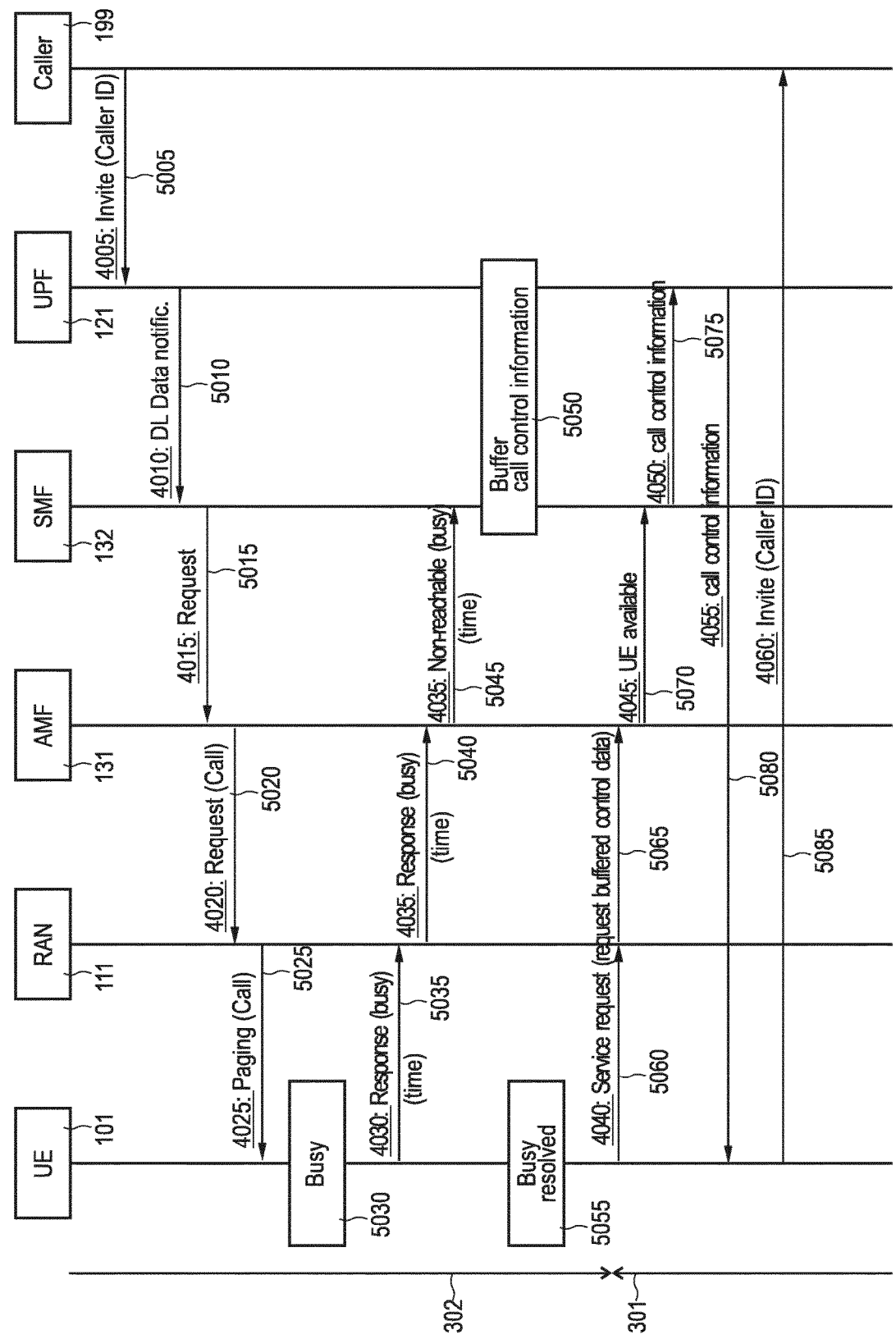
FIG. 10 is a signaling diagram of communication between multiple nodes according to various examples.

FIG. 10 is a signaling diagram of communication between the various nodes. FIG. 10 is a scenario explained in the context of a data transfer implemented by a call. Here, the data transfer control information is implemented by call control information. Similar techniques may be readily applicable to other kinds and types of data transfers.

At 5005, and originator 199 transmits an SIP Invite control message 4005 and the SIP Invite control message 4005 is routed via the UPF 121. A respective data packet can include the SIP Invite control message 4005.

At 5010, the UPF 121 triggers a downlink data notification 4010 to be provided to the SMF 132.

The SMF 132, then transmits a request message 4015 at 5015 to the AMF 131, thereby requesting to page the UE 101. The request message 4015 can be indicative of the incoming data transfer being an incoming call.

The AMF 131 then requests RAN 111 to page the UE 101. A respective request message 4020 is transmitted by the AMF 131 to the RAN 111, at 5020. The request message 4020 includes a cause value indicating the incoming call.

Then, a base station 112 (not shown in FIG. 10) that is part of the RAN 111 transmits the paging message 4025 at 5025 and the UE 101 receives the paging message 4025. The paging message 4025 in the illustrated scenario includes a cause value that is indicative of the reason for the paging being an incoming call. Such a cause value is generally optional.

The UE 101 detects that it is being paged and determines, at 5030, at least one busy event (cf. TAB. 1). Thus, the UE 101 decides not to respond to the incoming call, i.e., not to engage in the call with the originator 199. For example, it would be possible that the UE 101 operates in the idle mode 302 with respect to the cellular NW 100 including the RAN 111 and further with respect to the identity associated with the incoming call. The busy event detected at box 5030 could pertain to the UE 101 operating with respect to this cellular NW or with respect to a further cellular NW and further with respect to a further identity in the connected mode 301 (cf. TAB. 1: example A).

At 5035, the UE 101 transmits a response message 4030. The response message 4030 is associated with the paging message 5025 and is indicative of the UE 101 being temporarily unavailable to respond to the incoming call. It would be possible that the response message includes a respective busy indicator and/or a respective predicted time duration for which the UE will be unable to respond to the incoming call.

At 5045, the AMF 131 then informs the SMF 132 that the UE 101 is not reachable due to being busy and includes the estimated time for non-reachability (cf. TAB. 2: option A—also option B would be possible; further, cf. TAB. 4, option B—also option A would be possible. A respective message 4035 is transmitted from the RAN 111 at 5040 to the AMF 131 and from the AMF 131 a respective indication 4035 is provided to the SMF 132 at 5045.

Then, control information is buffered at the SMF 132 and/or the UPF 121—both being options for implementation of a session control node. For example, the SIP Invite message could be buffered. It would be possible to label the SIP Invite messages having been buffered (cf. TAB. 3).

At box 5055, the one or more busy events are resolved. The UE 101 can then operate in the connected mode 301.

The UE 101 follows-up with a service request 4040 which is provided via the RAN 111 (5060) to the AMF 131 (5065). The service request 4040 can include a specific cause value indicative of the UE 101 having resolved the busy events at 5055 and/or requesting the datatransfer control information; it would also be possible to re-use the cause value of the service request 4040 from other scenarios, e.g., MT data or higher latency used for CIoT. Then, from the context of having previously received the response message 4030 including the busy indication, can be judged that the UE intends to obtain the call control information being buffered.

The AMF 131 then, at 5070, sends a notification 4045 to the SMF 132, indicative of the UE 101 now being available (cf. box 3220). The SMF 132 can trigger to send the buffered call control information to the UE 101, e.g., by transmitting a respective message 4050 at 5075 to the UPF 121, e.g., in case the call control information is buffered at the UPF 121. Then, the UPF 121 can transmit the call control information 4055 at 5080 to the UE 101.

The call control information 4055 can be labelled as having been buffered (cf. TAB. 3). For instance, a respective indicator may be included in the call control information 4055 itself or may be transmitted along with the call control information 4055. For illustration, it would be possible that the call control information has been time stamped, e.g., when commencing the buffering at 5050. Thereby, the UE can detect that the call control information 4055 is outdated/old and may not directly respond to the SIP Invite associated with the call control information 4055. Rather, the UE can trigger call at 5085 to call back the originator/caller 199 based on information that is based on the call control information 4055. For illustration, it would be possible that the UE 101 extracts the address/identity of the originator 199 from the call control information 4055, e.g., from the SIP Invite message.

Above, a scenario has been illustrated in connection with FIG. 10 in which the call control information is buffered at a core NW node such as the SMF 132 or the UPF 121. These are only examples. For illustration, a scenario would be conceivable in which the call control information is buffered in a node of a data NW handling the incoming call, e.g., an IMS NW. In yet another example, it would be possible that the call control information is buffered at the base station 112 or more generally at the RAN 111. In particular, the latter scenario may be applicable for an implementation of the disconnected mode as 3GPP NR RRC Inactive: here, paging is handled by the RAN 111, not by the AMF 131. Then, it can be helpful to buffer the control information that the respective base station 112 of the RAN 111 and deliver the call control information upon the UE 101 transitioning to the connected mode 301.

Summarizing, above, techniques have been described that are associated with a paging procedure of a UE triggered by an incoming data transfer directed to the UE and an associated indication that the UE is temporarily unavailable to respond to the incoming data transfer. Specifically, the incoming data transfer could be an incoming call, e.g., a voice call or a video call.

Such information that the UE was not reachable due to being busy can be forwarded from a paging control node and processed at the core NW or a data NW such as the IMS NW. For example, the AMF can inform the SMF that the UE was not reachable due to being busy.

It is then possible that a session control node—e.g., a node of a cellular NW or a node of a data NW connected to the cellular NW, e.g., in IMS node—takes the decision on whether to implement extended buffering of data-transfer control information or not. Extended buffering can pertain to a scenario in which the data-transfer control information is retained in a buffer for a prolonged duration, e.g., if compared to reference scenarios in which data-transfer control information is retained in a buffer until completion of a paging procedure. According to the techniques described herein, the data-transfer control information can be buffered well beyond the completion of the paging procedure, even if the paging procedure has been escalated.

Various decision criteria have been described that could be considered by the session contort node when taking a decision on whether to buffer or not buffer the data-transfer control information. For illustration, such decision criteria may include a type of the data transfer: for instance, it would be possible that call control information is buffered for a data transfer implemented by a call, but that data-transfer control information is not buffer for a data transfer implemented by, e.g., a push message received from a webpage or another non-call application. Other scenarios are possible in which the session control node always implements the extended buffering upon receiving a respective indication from the paging control node.

According to various examples described herein, buffering could be implemented at different nodes, e.g., in the control plane of the core of the cellular NW—e.g., at the SMF —, in the data plane of the core of the cellular NW—e.g., at the UPF, or at the IMS.

It is possible to label the buffered data-transfer control information as having been buffered. For example, an indication or extension field may be attached to the data-transfer control information that is indicative thereof. In order for the UE to be able to understand that the UE shall not, when finally receiving the buffered data-transfer control information, directly respond thereto, but otherwise comments with the data transfer. For illustration, in a scenario in which the incoming data transfer is implemented by incoming call, it would be possible that the UE extracts the address of the originator of the incoming call and then places an outgoing call to the originator of the incoming call, instead of simply responding to the SIP Invite control message.

According to various examples described herein, the data transfer control message may be automatically provided to the UE, e.g., upon the UE transitioning to a connected mode. In other examples, would also be possible that the UE makes a request to query the buffered data-transfer control information. For example, an SIP Service Request could be made, for an implementation of the data transfer is an incoming call. The SIP Service Request could include a respective cause value or another type of SIP Service Request message may be defined for this reason.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

For illustration, according to various examples, the UE transmits a request message requesting buffered data-transfer control information. In other examples, it would be possible that no such request message is transmitted by the UE, but that a network node monitors whether the UE retransmissions into connected mode and then triggers the provisioning of the datatransfer control information to the UE based on such monitoring.

The invention claimed is:

1. A method of operating a paging control node of a communications network, the method comprising:
   upon detecting a data transfer for a wireless communication device, wherein the data transfer comprises an incoming call, triggering a paging procedure to page the wireless communication device,
   receiving, from the wireless communication device, a response message indicative of the wireless communication device being temporarily busy, and
   providing an indicator indicative of the wireless communication device being unable to engage in the data transfer comprising the incoming call to a session control node associated with the data transfer, to thereby facilitate buffering of data transfer control information associated with the data transfer,
   wherein the data transfer control information comprises call control information related to the incoming call,
   wherein the paging control node comprises an access and mobility function (AMF).

2. The method of claim 1, further comprising:
   in response to receiving the response message, aborting an escalation of the paging procedure and/or blocking one or more further paging procedures associated with one or more further data transfers being scheduled for the wireless communication device.

3. The method of claim 1, wherein the response message comprises an indicator indicative of a predicted time duration for which the wireless communication device will be unable to engage in the data transfer, wherein the method further comprises:
   indicating the predicted time duration to the session control node.

4. The method of claim 1, wherein the indicator indicative of the wireless communication device being temporarily unable to engage in the data transfer is indicative of the wireless communication device being temporarily busy.

5. A method of operating a session control node of a communications network, the method comprising:
   upon detecting a data transfer for a wireless communication, wherein the data transfer comprises an incoming call, obtaining, from a paging control node comprising an access and mobility function (AMF), an indicator indicative of a wireless communication device being temporarily busy;
   in response to obtaining the indicator of the wireless communication device being temporarily busy, buffering data transfer control information of the data transfer, wherein the data transfer control information comprises call control information related to the incoming call; and
   when completing said buffering, facilitating providing the data transfer control information to the wireless communication device.

6. The method of claim 5, further comprising:
   labeling the call control information related to the incoming call as having been buffered.

7. The method of claim 5, further comprising:
   while buffering the call control information related to the incoming call, monitoring for a discard event; and
   upon detecting the discard event based on said monitoring, discarding the call control information.

8. The method of claim 7, wherein the discard event is at least one of a response timeout without receiving a trigger from the wireless communication device or a release indication received from an originator of the incoming call.

9. The method of claim 5, wherein the call control information related to the incoming call is provided to the wireless communication device upon a respective request from the wireless communication device.

10. The method of claim 5, further comprising:
    obtaining, from the paging control node, indicator indicative of a predicted time duration for which the wireless communication device will be unable to engage in the data transfer.

11. A paging control node of a communications network including control circuitry and an interface configured to interface with one or more nodes of the communications network, wherein the control circuitry is configured to:
    upon detecting a data transfer for a wireless communication device, wherein the data transfer comprises an incoming call, trigger a paging procedure to page the wireless communication device;
    receive, via the interface, from the wireless communication device, a response message indicative of the wireless communication device being temporarily busy; and provide, via the interface, an indicator indicative of the wireless communication device being unable to engage in the data transfer comprising the incoming call to a session control node associated with the data transfer, to thereby facilitate buffering of data transfer control information associated with the data transfer, wherein the data transfer control information comprises call control information related to the incoming call, wherein the paging control node comprises an access and mobility function (AMF).

12. A session control node of a communications network including control circuitry and an interface configured to interface with one or more nodes of the communications network, wherein the control circuitry is configured to:

upon detecting a data transfer for a wireless communication, wherein the data transfer comprises an incoming call, obtain, via the interface, from a paging control node comprising an access and mobility function (AMF), an indicator indicative of a wireless communication device being temporarily busy;

in response to obtaining the indicator of the wireless communication device being temporarily busy, buffer data transfer control information of the data transfer, wherein the data transfer control information of the data transfer comprises call control information relating to the incoming call; and when completing the buffer of the data transfer control information of the data transfer, facilitate, via the interface, providing the data transfer control information to the wireless communication device.

* * * * *